J. Tort.

Water Wheel.

No. 95,954. Patented Oct. 19, 1869.

WITNESSES:

INVENTOR:

United States Patent Office.

JOSÉ TORT, OF MEXICO, MEXICO

Letters Patent No. 95,954, dated October 19, 1869.

IMPROVEMENT IN WATER-WHEELS.

The Schedule referred to in these Letters Patent and making part of the same.

*To all whom it may concern:*

Be it known that I, JOSÉ TORT, of the city of Mexico, in the Republic of Mexico, have invented a new and useful Improvement in Water-Wheels; and I do hereby declare that the following is a full, clear, and exact description thereof, which will enable others skilled in the art to make and use the same, reference being had to the accompanying drawing, forming part of this specification.

This invention relates to improvements in water-wheels, having for its object to utilize both the direct and reacting forces of the water, the said invention being based on the following theory:

Any pressure brought to bear upon a liquid contained in any recipient is equally distributed in every part of the same, and its particles, as also the surfaces which it encounters, either submerged or contingent, receive the same pressure that they would if acted upon directly. On this law of physics rests the theory of the turbine invented by me.

If, in any recipient filled with a liquid, on which a certain pressure is brought to bear, a hole or orifice be made, the liquid will come out through said orifice with an impulsive force, proportioned to the pressure acting upon the liquid. If this orifice be made in a movable apparatus, properly placed, the impulsive force of the liquid, on going out, produces a repulsive force on the apparatus theoretically, but, owing to friction, &c., not practically equal to the former, and causes movement of the apparatus. On this principle is based the motion of the turbines now known.

The object of my invention is to utilize the impulsive force by means of an improved construction of parts, as hereinafter specified.

The impulsive force of the liquid, on rushing out of the orifices of the turbines commonly in use, produces an amount of motion proportioned to the reactionary power determined in the apparatus which holds it; but the liquid escapes freely, and without hindrance, by the orifice, losing all its impulsive power, without any use being made of the same.

I place an obstacle additional to that offered by the atmosphere, upon which the impulsive force of the water may act to a greater or less degree.

The friction of the walls or sides of the tubes or receptacles, which contain the liquid, the resistance of the half, &c., must diminish the impulsive and repulsive effect of the liquid, as is actually the case, and on this account the water never rises to the same height from which it falls.

Furthermore, whereas by making use of the impulsive force of the liquid, I cause two forces diametrically opposed to one another to work to the same end, it is clear that the momentaneous increase in the one (for any accidental cause whatever) governs the decrease in the other, and *vice versa*, which causes one to regulate the other, or rather causes them to regulate one another, for their equilibrium and the amount of motion coming from both are more regular and constant in their working; that is to say, any irregularities or variations of motion, which might be suddenly imparted to the first wheel by variations in the force of the water, will, in a great measure, be regulated by the action of the second wheel, through the gearing or governor, the latter wheel being less affected by such changes than the first.

In the accompanying drawings—

Similar letters of reference indicate corresponding parts.

Figure 1:
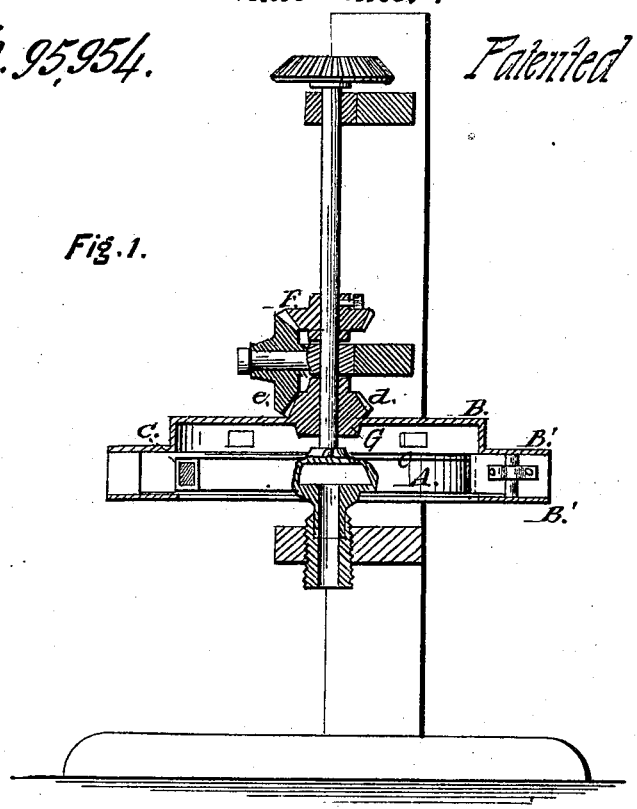
Figure 1 represents a sectional elevation of my improved wheel.
Figure 2:
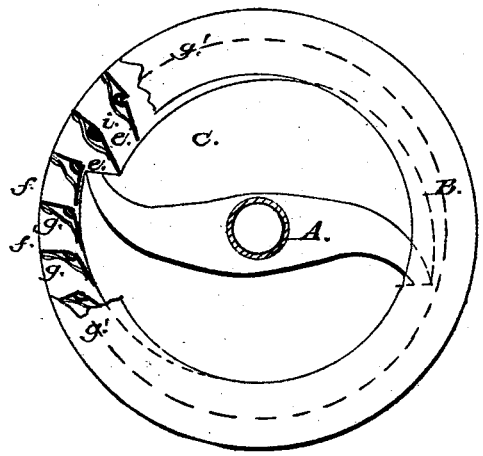
Figure 2 represents a plan of the bottom, partly broken out.

The turbine, known as the Scotch turbine, which is the system used for the repulsive power of water, is the one which is the subject of my improvement in the present instance, having in view to increase the power of the same.

On these turbines is placed a wheel, which receives the water which comes out of the orifices of said turbine, making use of the impulsive power by means of fixed and hinged buckets, the latter of which open and close at the proper time, as will be seen from the following explanation.

The turbine A is covered by a wheel, B, which wheel is placed on the shaft or post to which the turbine is attached, the wheel B having, in its centre, a hub, $a$, encircling the shaft, so that it may revolve easily, its motion being contrary to that of the turbine. This motion is changed to unite with that of the turbine by means of cog-wheels $d$ $e$ $f$, as is shown in the drawings.

The turbine has on top, and attached to it, an eccentric wheel or disk, C. This wheel has for its object the closing of the hinged buckets of the wheel B, when these are over the orifices of the turbine.

These hinged buckets are opened by springs $g$, to receive the water, with the object of making use of all the water, and receiving it directly, to gain thereby the greatest amount of power.

These buckets are arranged around the turbine as follows:

The outer wheel is made of two rims, B', with iron plates, $f'$, perpendicular to the centre of the wheel. These plates are on the inside of the rims B' of the wheel, and adjoining the periphery of the same. The lines $f''$ show the plates as seen perpendicularly.

On the inside part of each plate, which terminates at the circle $g$, the movable buckets $e'$ are hung. The free ends of these buckets rest on the eccentric wheel or disk C. On being pushed by the springs $g$, these plates open, forming an obtuse angle when they receive the water. Before receiving it, they form a right angle with the fixed plates.

As the eccentric turns in a contrary direction to the wheel B, and as the hinged buckets of this last rest on the eccentric, it works so that on the arrival of the plates opposite the orifices of the turbine, the plates $e'$ open so as to take in all the water, and make use of all the power, presenting, at the same time, an obstacle to its outlet, and giving greater impulse to the turbine.

Fig. 1 shows the turbine covered by the wheel B, and the combination of the cog-wheels to unite the two powers, so that they may work to the same end.

The buckets $e'$ are arrested when swinging open, at the proper point, by pins $i$.

Having thus described my invention,

What I claim as new, and desire to secure by Letters Patent, is—

1. The combination of the wheel A and eccentric plate C with the wheel B, when the latter is arranged to enclose the former, substantially as shown and described.

2. The combination of the fixed buckets $f'$, hinged buckets $e'$, springs $g$, and eccentric plate C, when arranged substantially as specified.

3. The toothed hub $a$, of the wheel B, the wheels $e$ $f$, and shaft of the wheel A, all combined and arranged as specified.

The above specification of my invention signed by me, this 4th day of May, 1869.

JOSÉ TORT.

Witnesses:
FRANK BLOCKLEY,
C. L. TOPLIFF.